United States Patent
Li

(10) Patent No.: US 11,010,010 B2
(45) Date of Patent: May 18, 2021

(54) THREE-DIMENSIONAL FORCE RECOGNITION SENSOR, DRIVING METHOD THEREFOR AND DISPLAY DEVICE

(71) Applicant: BOE Technology Group Co., Ltd., Beijing (CN)

(72) Inventor: Haixu Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/641,419

(22) PCT Filed: Apr. 18, 2019

(86) PCT No.: PCT/CN2019/083270
§ 371 (c)(1),
(2) Date: Feb. 24, 2020

(87) PCT Pub. No.: WO2019/214418
PCT Pub. Date: Nov. 14, 2019

(65) Prior Publication Data
US 2020/0241706 A1    Jul. 30, 2020

(30) Foreign Application Priority Data

May 10, 2018    (CN) .......................... 201810442409.7

(51) Int. Cl.
*G06F 3/044*    (2006.01)
*G06F 3/041*    (2006.01)
*G06F 3/045*    (2006.01)

(52) U.S. Cl.
CPC ............ *G06F 3/0447* (2019.05); *G06F 3/045* (2013.01); *G06F 3/0414* (2013.01)

(58) Field of Classification Search
CPC ....... G06F 3/0414; G06F 3/0447; G06F 3/045
See application file for complete search history.

(56) References Cited

U.S. PATENT DOCUMENTS

2012/0293491 A1    11/2012    Wang et al.
2012/0313872 A1    12/2012    Zhang et al.
(Continued)

FOREIGN PATENT DOCUMENTS

| CN | 102819330 A | 12/2012 |
|---|---|---|
| CN | 104298393 A | 1/2015 |

(Continued)

OTHER PUBLICATIONS

Chinese Office Action in corresponding application No. 201810442409.7 dated Dec. 13, 2019.

*Primary Examiner* — Afroza Chowdhury
(74) *Attorney, Agent, or Firm* — Arent Fox LLP; Michael Fainberg

(57) ABSTRACT

The present disclosure relates to a three-dimensional force recognition sensor, a driving method therefor and a display device. A first conductive layer and a second conductive layer are respectively provided on two sides of a pressure-sensitive conductive layer, wherein the first conductive layer includes multiple first electrode groups arranged side by side, and each first electrode group comprises at least two first electrodes which extend in a first direction and are arranged side by side and insulated from each other; and the second conductive layer comprises multiple second electrode groups arranged side by side, and each second electrode group comprises at least two second electrodes which extend in a second direction and are arranged side by side and insulated from each other.

15 Claims, 4 Drawing Sheets

(56) References Cited

U.S. PATENT DOCUMENTS

| | | | |
|---|---|---|---|
| 2015/0022491 A1 | 1/2015 | Dumitru et al. | |
| 2015/0346866 A1* | 12/2015 | Kusunoki | G06F 3/0488 |
| | | | 345/174 |
| 2015/0363023 A1* | 12/2015 | Kawaguchi | G06F 3/0443 |
| | | | 345/174 |
| 2016/0011691 A1 | 1/2016 | Shinkai et al. | |
| 2016/0162079 A1 | 6/2016 | Jing et al. | |
| 2016/0162093 A1 | 6/2016 | Kim et al. | |
| 2016/0282999 A1* | 9/2016 | Hwang | G06F 3/0446 |
| 2017/0356815 A1* | 12/2017 | Madden | G06F 3/0416 |
| 2017/0357346 A1 | 12/2017 | Wang | |
| 2020/0241706 A1 | 7/2020 | Li | |

FOREIGN PATENT DOCUMENTS

| | | |
|---|---|---|
| CN | 104406722 A | 3/2015 |
| CN | 105009045 A | 10/2015 |
| CN | 105183208 A | 12/2015 |
| CN | 105224126 A | 1/2016 |
| CN | 105607790 A | 5/2016 |
| CN | 106933424 A | 7/2017 |
| CN | 106959790 A | 7/2017 |
| CN | 108595055 A | 9/2018 |
| JP | 59178301 A | 3/1986 |
| KR | 20160068439 A | 6/2016 |
| KR | 101655427 B1 | 9/2016 |

\* cited by examiner

THREE-DIMENSIONAL FORCE RECOGNITION SENSOR, DRIVING METHOD THEREFOR AND DISPLAY DEVICE

CROSS REFERENCE TO RELATED APPLICATION

This application is a US National Stage of International Application No. PCT/CN2019/083270, filed on Apr. 18, 2019, which claims priority to Chinese patent application No. 201810442409.7, filed with Chinese Patent Office on May 10, 2018, entitled "Three-Dimensional Force Recognition Sensor, Driving Method Therefor and Display Device", which is incorporated herein by reference in its entirety.

FIELD

The present disclosure relates to the field of touch control technology, and in particular to a three-dimensional force recognition sensor, a driving method therefor and a display device.

BACKGROUND

With the continuous development of touch control technology, application of pressure touch detection has greatly improved user experience. At present, pressure recognition is mainly used to recognize a pressure directed to the bottom of a screen, and there is a lack of application in which a horizontal force is recognized. Application of horizontal force recognition includes, for example, a mobile game. During the game, operations of moving up, down, left, and right are usually performed by sliding on the screen. By recognizing a force in the horizontal direction, a movement trend of a finger in the horizontal direction can be determined to improve the user experience.

Therefore, how to provide a sensor capable of recognizing a three-dimensional force is a technical problem to be solved by those skilled in the art.

SUMMARY

A three-dimensional force recognition sensor provided by an embodiment of the present disclosure includes:

a first conductive layer including multiple first electrode groups arranged side by side, where each first electrode group includes at least two first electrodes which extend in a first direction and are arranged side by side and insulated from each other;

a pressure-sensitive conductive layer covering the first conductive layer; and a second conductive layer arranged on a side, away from the first conductive layer, of the pressure-sensitive conductive layer, where the second conductive layer includes multiple second electrode groups arranged side by side, each second electrode group includes at least two second electrodes which extend in a second direction and are arranged side by side and insulated from each other;

where the first direction intersects with the second direction.

Optionally, in the three-dimensional force recognition sensor provided by an embodiment of the present disclosure, the first direction is perpendicular to the second direction.

Optionally, in the three-dimensional force recognition sensor provided by an embodiment of the present disclosure, the first electrodes are parallel to each other.

Optionally, in the three-dimensional force recognition sensor provided by an embodiment of the present disclosure, a spacing between adjacent two first electrodes in each first electrode group is equal.

Optionally, in the three-dimensional force recognition sensor provided by an embodiment of the present disclosure, a spacing between adjacent two of the first electrode groups is greater than the spacing between the adjacent two first electrodes in a same first electrode group.

Optionally, in the three-dimensional force recognition sensor provided by an embodiment of the present disclosure, the second electrodes are parallel to each other.

Optionally, in the three-dimensional force recognition sensor provided by an embodiment of the present disclosure, a spacing between adjacent two second electrodes in each second electrode group is equal.

Optionally, in the three-dimensional force recognition sensor provided by an embodiment of the present disclosure, a spacing between adjacent two of the second electrode groups is greater than the spacing between the adjacent two second electrodes in a same second electrode group.

Optionally, the three-dimensional force recognition sensor provided by the embodiment of the present disclosure further includes a horizontal pressure recognition component, where the horizontal pressure recognition component is configured to determine a horizontal pressure direction at a touch control position by detecting a change in a resistance between each of the two first electrodes in each of the first electrode groups and one of the second electrodes in each of the second electrode group, respectively, and detecting a change in the resistance between each of the two second electrodes in each of the second electrode groups and one of the first electrodes in each of the first electrode groups.

Optionally, the three-dimensional force recognition sensor provided by the embodiment of the present disclosure further includes a vertical pressure recognition component, where the vertical pressure recognition component is configured to determine a magnitude of a vertical pressure at a touch control position according to a change in capacitances between the first electrode groups and the second electrode groups.

Optionally, the pressure-sensitive conductive layer includes a resin and conductive particles uniformly mixed in the resin.

Optionally, the resin is a phenol resin or a siloxane.

Optionally, the conductive particles are carbon black.

Correspondingly, an embodiment of the present disclosure further provides a driving method for the above any three-dimensional force recognition sensor, where when performing horizontal pressure recognition, the driving method includes:

using one of the first electrodes in each of the first electrode groups as a first recognition electrode, and using one of the second electrodes in each of the second electrode groups as a second recognition electrode;

applying a voltage to each first recognition electrode successively, detecting a resistance between each of the second electrodes and the first recognition electrode in a time-sharing manner, and determining a pressure in the first direction at a touch control position according to a change in the resistance between each of the two second electrodes in the same second electrode group and the first recognition electrode, respectively;

applying a voltage to each second recognition electrode successively, detecting a resistance between each of the first electrodes and the second recognition electrode in a time-sharing manner, and determining a pressure in the second direction at the touch control position according to a change in the resistance between each of the two first electrodes in the same first electrode group and the second recognition electrode, respectively; and determining a horizontal pressure direction at the touch control position according to the pressure in the first direction and the pressure in the second direction.

Optionally, in the driving method provided by the embodiment of the present disclosure, when performing vertical pressure recognition, the driving method further includes:

applying a voltage to each of the first electrode groups successively, detecting capacitances between the second electrode groups and the first electrode groups in a time-sharing manner, and determining a vertical pressure at the touch control position according to a change in the capacitances between the first electrode groups and the second electrode groups; or applying a voltage to each of the second electrode groups successively, detecting capacitances between the first electrode groups and the second electrode groups in a time-sharing manner, and determining a vertical pressure at the touch control position according to a change in the capacitances between the first electrode groups and the second electrode groups.

Correspondingly, an embodiment of the present disclosure further provides a display device, including a flexible display panel and the above any three-dimensional force recognition sensor provided by the embodiments of the present disclosure.

Optionally, in the display device provided by the embodiment of the present disclosure, the flexible display panel is any one of a liquid crystal display panel, an organic electroluminescent display panel, a plasma display panel or electronic paper.

The present disclosure has the following beneficial effects:

in the above three-dimensional force recognition sensor, driving method therefor and display device provided by the embodiments of the present disclosure, the first conductive layer and the second conductive layer are respectively arranged on two sides of the pressure-sensitive conductive layer, where the first conductive layer includes multiple first electrode groups arranged side by side, and each first electrode group includes two first electrodes which extend in the first direction and are arranged side by side and insulated from each other; and the second conductive layer includes multiple second electrode groups arranged side by side, and each second electrode group includes two second electrodes which extend in the second direction and are arranged side by side and insulated from each other. A resistance of the pressure-sensitive conductive layer may change under the action of pressure, and thus the horizontal pressure direction may be determined by using the change in the resistance between the same one electrode and the electrodes in one group of the other conductive layer. the capacitances between the first electrode groups and the second electrode groups may change under the action of pressure, and thus the magnitude of a vertical pressure may be determined, thereby recognizing and determining a three-dimensional force.

DETAILED DESCRIPTION OF THE EMBODIMENTS

To make the objects, technical solutions and advantages of the present disclosure clearer, the present disclosure will be further described in detail below in combination with the accompanying drawings. Apparently, the embodiments described are part of, rather than all of, the embodiments of the present disclosure. Based on the embodiments of the present disclosure, all other embodiments obtained by ordinary those skilled in the art without creative work shall fall within the protection scope of the present disclosure.

Shapes and sizes of components in the accompanying drawings do not reflect the true scale, and are merely intended to illustrate contents of the present disclosure.

Figure 1:
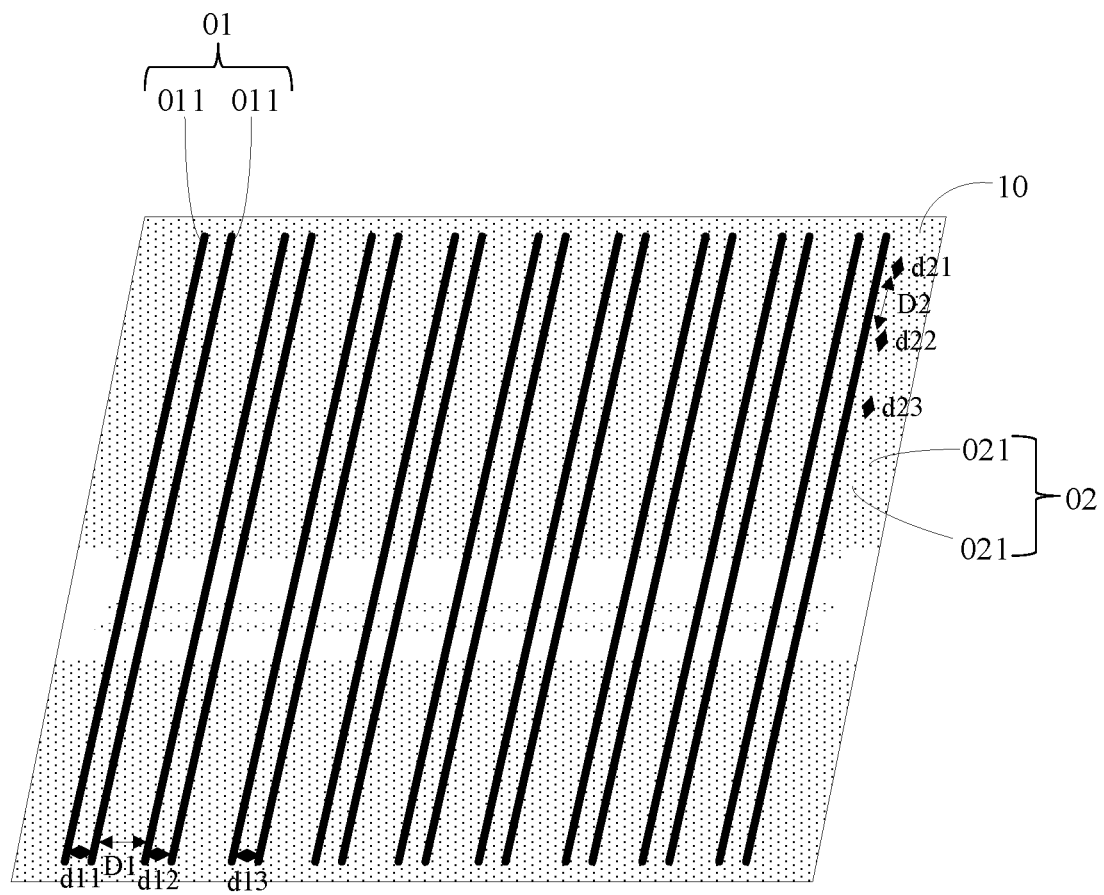
FIG. 1 is a structural schematic diagram of a three-dimensional force recognition sensor provided by an embodiment of the present disclosure.

A three-dimensional force recognition sensor provided by an embodiment of the present disclosure, as shown in FIG. 1, includes:

a first conductive layer including multiple first electrode groups 01 arranged side by side, where each first electrode group 01 includes at least two first electrodes 011 which extend in a first direction and are arranged side by side and insulated from each other;

a pressure-sensitive conductive layer 10 covering the first conductive layer; and a second conductive layer arranged on a side, away from the first conductive layer, of the pressure-sensitive conductive layer 10, where the second conductive layer includes multiple second electrode groups 02 arranged side by side, and each second electrode group 02 includes at least two second electrodes 021 which extend in a second direction and are arranged side by side and insulated from each other;

where the first direction intersects with the second direction.

In the three-dimensional force recognition sensor provided by the embodiment of the present disclosure, the first conductive layer and the second conductive layer are respectively arranged on two sides of the pressure-sensitive conductive layer, where the first conductive layer includes multiple first electrode groups arranged side by side, and each first electrode group includes two first electrodes which extend in the first direction and are arranged side by side and insulated from each other; and the second conductive layer includes multiple second electrode groups arranged side by side, and each second electrode group includes two second electrodes which extend in the second direction and are arranged side by side and insulated from each other. A resistance of the pressure-sensitive conductive layer may change under the action of pressure, and thus the direction of a horizontal pressure may be determined by using a change in the resistance between the same one electrode and the electrodes in one group of the other conductive layer. Capacitances between the first electrode groups and the second electrode groups may change under the action of pressure, and thus a magnitude of a vertical pressure may be determined, thereby recognizing and determining a three-dimensional force.

In specific implementation, in the embodiment of the present disclosure, each first electrode group may specifically includes two first electrodes, and each second electrode group may specifically includes two second electrodes.

It should be noted that, in the three-dimensional force recognition sensor provided by the embodiment of the present disclosure, the vertical pressure refers to a force in a direction perpendicular to the surface of the pressure-sensitive conductive layer in the three-dimensional force recognition sensor, and the horizontal pressure refers to a force in a direction parallel to the surface of the pressure-sensitive conductive layer.

Specifically, the first direction intersects with the second direction, that is, the first direction and the second direction are set to cross each other, so as to ensure the first electrode groups and the second electrode groups have crossover areas, and therefore, not only determination of the vertical pressure but also recognition of the horizontal pressure can be achieved.

Optionally, in the three-dimensional force recognition sensor provided by the embodiment of the present disclosure, the first direction is perpendicular to the second direction, that is, the first electrode groups and the second electrode groups are arranged orthogonally.

Optionally, in the three-dimensional force recognition sensor provided by the embodiment of the present disclosure, the first direction may be a row direction, and the second direction may be a column direction, which are not limited herein.

Optionally, in the three-dimensional force recognition sensor provided by the embodiment of the present disclosure, the first electrodes in the first conductive layer are parallel to each other.

Optionally, a spacing between adjacent two first electrodes in each first electrode group is equal. That is, in the three-dimensional force sensor as shown in FIG. 1, a spacing d11 between the two first electrodes in the first group of the first electrode groups from the left is equal to a spacing d12 between the two first electrodes in the second group of the first electrode groups from the left, and also equal to a spacing d13 between the two first electrodes in the third group of the first electrode groups from the left.

Optionally, as shown in FIG. 1, a spacing D1 between adjacent two of the first electrode groups is greater than the spacing d11 (d12 or d13) between the adjacent two first electrodes in a same first electrode group.

Optionally, in the three-dimensional force recognition sensor provided by the embodiment of the present disclosure, the second electrodes in the second conductive layer are parallel to each other.

Optionally, a spacing between adjacent two second electrodes in each second electrode group is equal. That is, for example, in the three-dimensional force sensor as shown in FIG. 1, in a direction from top to bottom, a spacing d21 between the two second electrodes in the first group of the second electrode groups is equal to a spacing d22 between the two second electrodes in the second group of the second electrode groups, and also equal to a spacing d23 between the two second electrodes in the third group of the second electrode groups.

Optionally, as shown in FIG. 1, a spacing D2 between adjacent two of the second electrode groups is greater than the spacing d21 (d22 or d23) between the adjacent two second electrodes in a same second electrode group.

Optionally, in the three-dimensional recognition sensor provided by the embodiment of the present disclosure, the first electrodes and the second electrodes are bar electrodes, and a specific shape of the first and second electrodes may be a regular rectangle, a zigzag shape, or a curved shape, which is not limited herein.

In specific implementation, the larger the areas between the first electrodes and the second electrodes are, the easier the recognition is. Therefore, the crossover areas of the first electrodes and the second electrodes may be set large.

In specific implementation, the pressure-sensitive conductive layer includes a resin and conductive particles uniformly mixed in the resin. The resin may be a phenol resin or a siloxane, and the conductive particles may be carbon black. That is, the pressure-sensitive conductive layer is formed by uniformly adding the conductive particles (such as carbon black) into an insulating macromolecular material, where the insulating macromolecular material may be a resin material such as the phenol resin or the siloxane.

Specifically, in the three-dimensional force recognition sensor provided by the embodiment of the present disclosure, when the pressure-sensitive conductive layer is not subjected to pressure, the resistance between the first electrode and the second electrode is larger. After being subjected to a force in the horizontal direction, the pressure-sensitive conductive layer deforms due to compression, so that the density of the conductive particles at the deformed place changes, resulting in a change in resistance between the electrodes. A horizontal movement trend is determined by recognizing two resistances between the first electrode groups and the second electrode groups. For example, if one resistance increases and the other resistance decreases, the horizontal movement trend is in a direction where the resistance decreases. Through recognition of resistances between the upper-layer electrodes and the lower-layer electrodes, first and second horizontal directions can be determined crosswise, thereby determining the direction of the horizontal force.

In addition, when the pressure-sensitive conductive layer is subjected to a force in a direction perpendicular to its surface, a distance between the upper-layer electrodes and the lower-layer electrodes changes, causing capacitances between the first electrode groups and the second electrode groups to change; and the vertical pressure is determined according to the change in the capacitances between the electrode groups and the second electrode groups.

Optionally, the three-dimensional force recognition sensor provided by the embodiment of the present disclosure further includes a horizontal pressure recognition component, where the horizontal pressure recognition component is configured to determine a horizontal pressure direction at a touch control position by detecting a change in a resistance between each of the two first electrodes in each first electrode group and one of the second electrodes in each second electrode group respectively, and detecting a change in a resistance between each of the two second electrodes in each second electrode group and one of the first electrodes in each first electrode group respectively.

Optionally, the three-dimensional force recognition sensor provided by the embodiment of the present disclosure further includes a vertical pressure recognition component, where the vertical pressure recognition component is configured to determine a magnitude of a vertical pressure at a touch control position according to a change in the capacitances between the first electrode groups and the second electrode groups.

Specifically, the vertical pressure recognition component and the horizontal pressure recognition component may be integrated in a same chip, and of course, may also be integrated in different chips, which is not limited herein.

Figure 2:
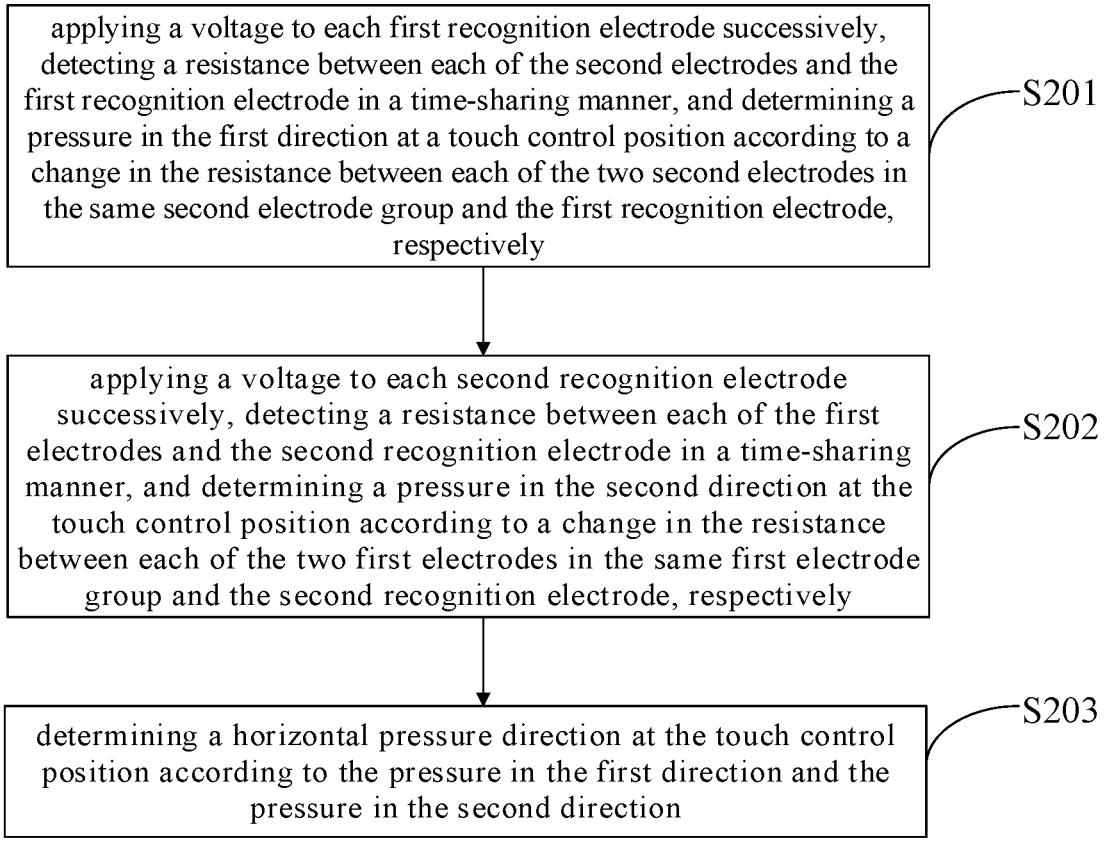
FIG. 2 is a flow schematic diagram of a driving method for a three-dimensional force recognition sensor when performing horizontal pressure recognition provided by an embodiment of the present disclosure.

Based on the same inventive concept, an embodiment of the present disclosure further provides a driving method for the above any three-dimensional force recognition sensor, where when performing recognition of the horizontal pressure direction, one of the first electrodes in each of the first electrode groups is used as a first recognition electrode, and one of the second electrodes in each of the second electrode groups is used as a second recognition electrode. As shown in FIG. 2, the driving method includes:

S201: applying a voltage to each first recognition electrode successively, detecting a resistance between each of the second electrodes and the first recognition electrode in a time-sharing manner, and determining a pressure in the first direction at a touch control position according to a change in the resistance between each of the two second electrodes in the same second electrode group and the first recognition electrode respectively;

S202: applying a voltage to each second recognition electrode successively, detecting a resistance between each of the first electrodes and the second recognition electrode in a time-sharing manner, and determining a pressure in the second direction at the touch control position according to a change in the resistance between each of the two first electrodes in the same first electrode group and the second recognition electrode respectively; and S203: determining a horizontal pressure direction at the touch control position according to the pressure in the first direction and the pressure in the second direction.

In specific implementation, the sequence of S201 and S202 is not limited; S201 may be executed before S202, and of course, S202 may also be executed before S201, which is not limited herein.

Figure 3:
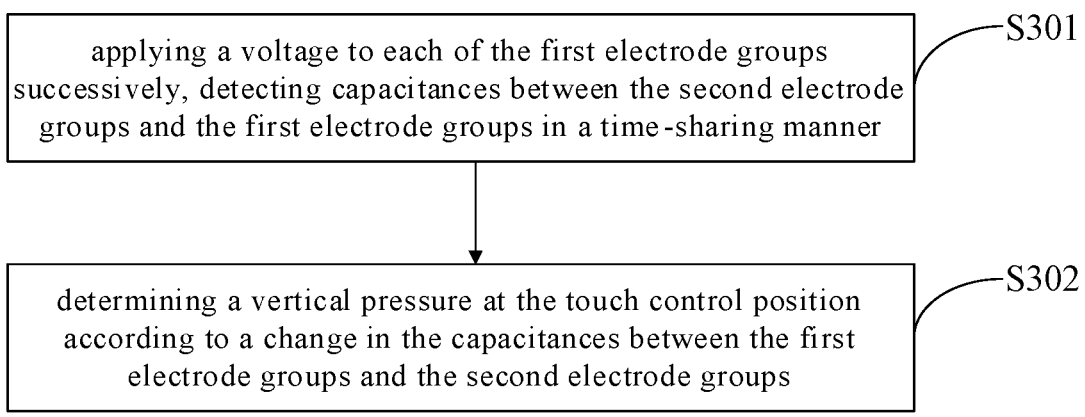
FIG. 3 is a flow schematic diagram of a driving method for a three-dimensional force recognition sensor when performing vertical pressure recognition provided by an embodiment of the present disclosure.

Optionally, in the driving method provided by the embodiment of the present disclosure, when performing recognition of a vertical pressure direction, as shown in FIG. 3, the driving method includes:

S301: applying a voltage to each of the first electrode groups successively, detecting capacitances between the second electrode groups and the first electrode groups in a time-sharing manner; and S302: determining a vertical pressure at the touch control position according to a change in the capacitances between the first electrode groups and the second electrode groups.

Figure 4:
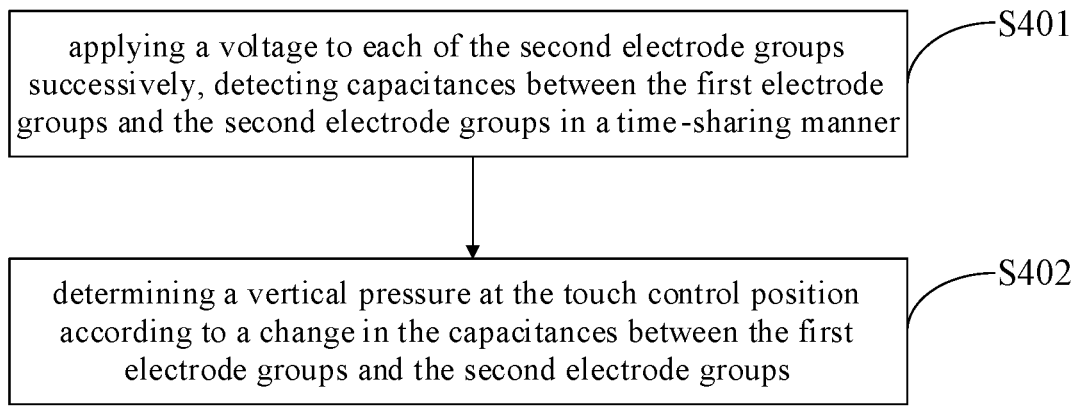
FIG. 4 is another flow schematic diagram of a driving method for a three-dimensional force recognition sensor when performing vertical pressure recognition provided by an embodiment of the present disclosure.

Or, as shown in FIG. 4, the driving method includes:

S401: applying a voltage to each of the second electrode groups successively, detecting capacitances between the first electrode groups and the second electrode groups in a time-sharing manner; and S402: determining a vertical pressure at the touch control position according to a change in the capacitances between the first electrode groups and the second electrode groups.

The working principle of the three-dimensional force recognition sensor provided by the embodiment of the present disclosure will be illustrated below in combination with the driving method.

Figure 5:
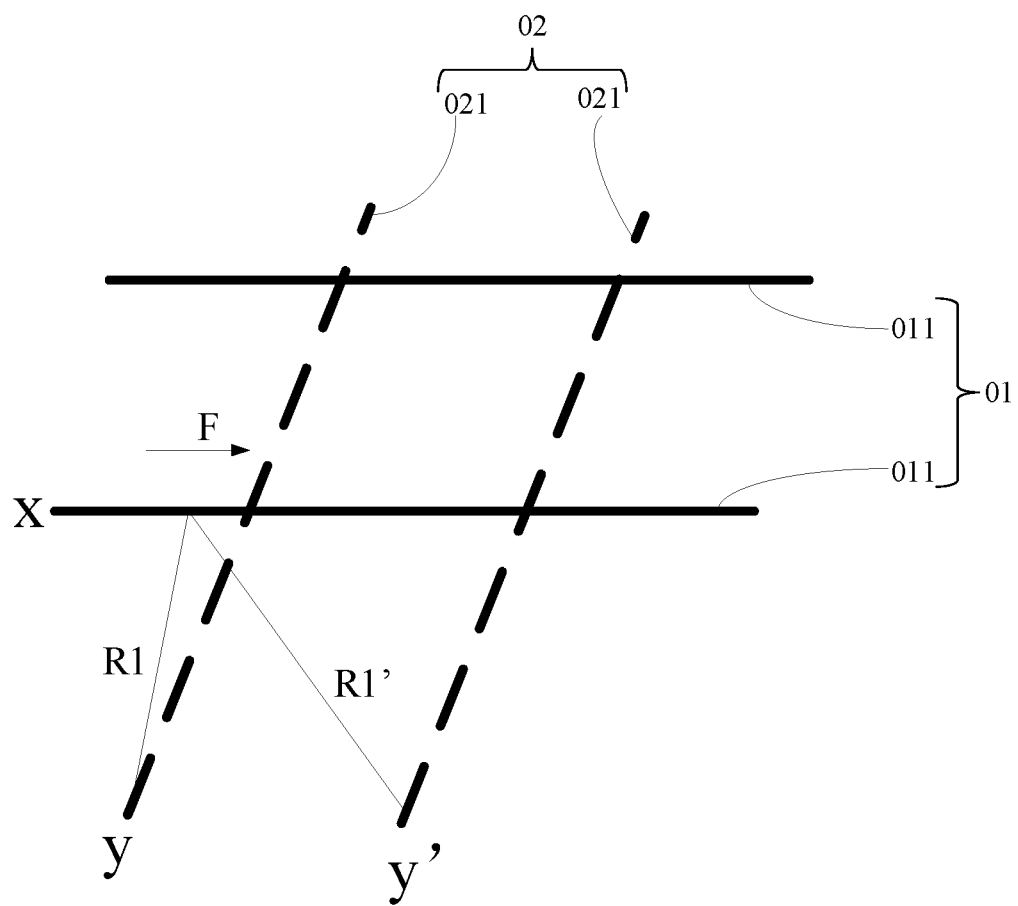
FIG. 5 is a schematic diagram of a three-dimensional force recognition sensor when recognizing a force in a first direction provided by an embodiment of the present disclosure.

Specifically, in the three-dimensional force recognition sensor provided by the embodiment of the present disclosure, when performing horizontal pressure recognition, one of the first electrodes in each first electrode group is selected as a first recognition electrode, and the two second electrodes in each second electrode group are used as sensing electrodes, a voltage is applied to each first recognition electrode successively, and when the voltage is applied to the nth first recognition electrode, a resistance between each of the second electrodes and the nth first recognition electrode is detected in a time-sharing manner. For example, as shown in FIG. 5, when a horizontal pressure is not applied to a position, resistances between a first recognition electrode x and two sensing electrodes (y and y') are R1 and R1', respectively. When the horizontal pressure is applied to the position, as the density of the conductive particles in the pressure-sensitive conductive layer at the position changes, the resistance can change, resulting in the change in the resistances between the first recognition electrode x and the two sensing electrodes (y and y') respectively. For example, in FIG. 5, a forward force F in the first direction increases the resistance between the first recognition electrode x and the sensing electrode y, and decreases the resistance between the first recognition electrode x and the sensing electrode y'. Therefore, the pressure in the first direction at the touch control position may be determined by detecting the change in the resistance between each of the two second electrodes 021 of the same second electrode group 02 and the first recognition electrode x respectively.

Figure 6:
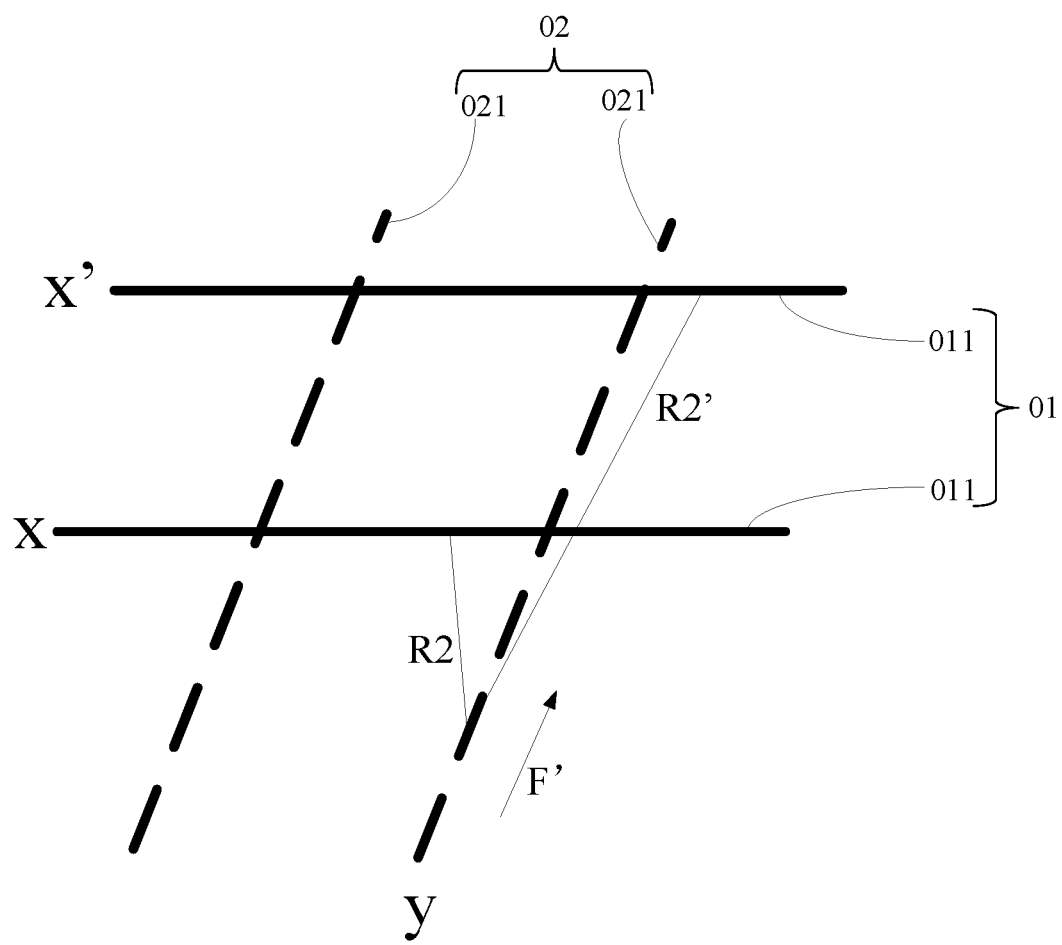
FIG. 6 is a schematic diagram of a three-dimensional force recognition sensor when recognizing a force in a second direction provided by an embodiment of the present disclosure.

Similarly, one of the second electrodes in each second electrode group is selected as a second recognition electrode, and the two first electrodes in each first electrode group are used as sensing electrodes. A voltage is applied to each second recognition electrode successively, and when the voltage is applied to the nth second recognition electrode, a resistance between each of the first electrodes and the nth second recognition electrode is detected in a time-sharing manner. For example, as shown in FIG. 6, when a horizontal pressure is not applied to a position, resistances between a second recognition electrode y and two sensing electrodes (x and x') are R2 and R2', respectively. When a horizontal pressure is applied to the position, as the density of the conductive particles in the pressure-sensitive conductive layer at the position changes, the resistance can change, causing the resistances between the second recognition electrode y and the two sensing electrodes (x and x') to change respectively. For example, in FIG. 6, a forward force F' in the second direction increases the resistance between the second recognition electrode y and the sensing electrode x, and decreases the resistance between the first recognition electrode y and the sensing electrode x'. Therefore, the pressure in the second direction at the touch control position may be determined by detecting a change in a resistance between each of the two first electrodes 011 in the same first electrode group 01 and the second recognition electrode y, respectively.

In this way, a force in any direction in a horizontal plane can be recognized after the pressure in the first direction and the pressure in the second direction are combined, and thus a finger movement trend is recognized.

Specifically, in the three-dimensional force recognition sensor provided by the embodiment of the present disclosure, when performing vertical pressure recognition, the first electrode groups (or the second electrode groups) are used as recognition electrodes, and the second electrode groups (or the first electrode groups) are used as sensing electrodes. A voltage is applied to the recognition electrodes successively, and capacitances of the sensing electrodes are detected in a time-sharing manner. By detecting a change in capacitances, for example, by detecting a change in a capacitance of the Yth sensing electrode when a voltage is applied to the Xth recognition electrode, the magnitude of the vertical pressure at a position (X, Y) can be determined according to the magnitude of the capacitances change.

Specifically, in manufacturing of the three-dimensional recognition sensor provided by the embodiment of the present disclosure, the first conductive layer may be formed on an underlying substrate; then the pressure-sensitive conductive layer is formed on the first conductive layer; and the second conductive layer is formed on the pressure-sensitive conductive layer. The first electrodes in the first conductive layer may be formed simultaneously by a one-time patterning process. Similarly, the second electrodes in the second conductive layer may also be formed simultaneously by a one-time patterning process.

Based on the same inventive concept, an embodiment of the present disclosure further provides a display device, including a flexible display panel and the above any three-dimensional force recognition sensor provided by the embodiments of the present disclosure. The display device may be a mobile phone, a tablet computer, a television, a display, a notebook computer, a digital photo frame, a navigator, or any other products or components with a display function. The implementation of the display device can refer to the above embodiments of the three-dimensional recognition sensor, and repeated content is not described here.

Further, in the above display device provided by the embodiment of the present disclosure, the flexible display panel may specifically be a liquid crystal display panel, an organic electroluminescent display panel, or a flat display panel such as a plasma display panel or electronic paper, which is not limited herein.

Specifically, in the display device provided by the embodiment of the present disclosure, the three-dimensional force recognition sensor may be embedded in the flexible display panel, or directly formed on the flexible display panel which is used as a substrate, and of course, may also be hung on the flexible display panel after being formed on the substrate, which is not limited herein.

Figure 7:
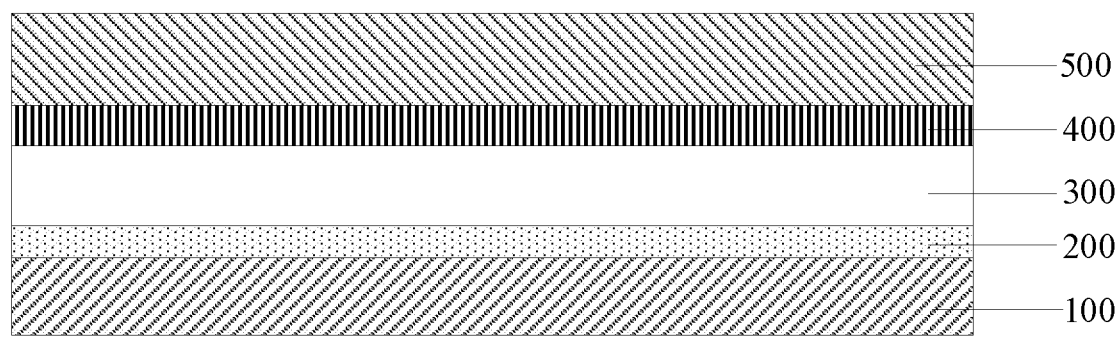
FIG. 7 is a structural schematic diagram of a display device provided by an embodiment of the present disclosure.

By taking a flexible display panel which is an organic electroluminescent display panel as an example below, as shown in FIG. 7, the flexible display panel includes a flexible substrate 100, an organic electroluminescent structure layer 200, a flexible insulating layer 300, a three-dimensional force recognition sensor 400, and a packaging layer 500. That is, the three-dimensional force recognition sensor 400 is embedded in the flexible display panel.

In specific implementation, the flexible material adopted by the display device is generally a polyimide (PI) material, which is not limited herein.

In the three-dimensional force recognition sensor, the driving method therefor and the display device provided by the embodiments of the present disclosure, a first conductive layer and a second conductive layer are respectively arranged on two sides of a pressure-sensitive conductive layer, where the first conductive layer includes multiple first electrode groups arranged side by side, and each first electrode group includes two first electrodes which extend in a first direction and are arranged side by side and insulated from each other; and the second conductive layer includes multiple second electrode groups arranged side by side, and each second electrode group includes two second electrodes which extend in a second direction and are arranged side by side and insulated from each other. A resistance of the pressure-sensitive conductive layer may change under the action of pressure, and thus a horizontal pressure direction may be determined by using a change in resistances between the same one electrode and the electrodes in one group of the other conductive layer. Capacitances between the first electrode groups and the second electrode groups may change under the action of pressure, and thus the magnitude of a vertical pressure may be determined, thereby recognizing and determining a three-dimensional force.

Apparently, those skilled in the art can make changes and modifications to the present disclosure without departing from the spirit and scope of the present disclosure. Thus, the present disclosure is also intended to include the changes and modifications if such changes and modifications of the present disclosure are within the scope of the claims of the present disclosure and equivalent technologies thereof.

The invention claimed is:

1. A three-dimensional force recognition sensor, comprising:
   multiple first electrode groups arranged side by side, wherein each first electrode group comprises at least two first electrodes which extend in a first direction and are arranged side by side and insulated from each other;
   a pressure-sensitive conductive layer covering the multiple first electrode groups; and
   multiple second electrode groups arranged on a side, away from the multiple first electrode groups, of the pressure-sensitive conductive layer, wherein the multiple second electrode groups are arranged side by side, and each second electrode group comprises at least two second electrodes which extend in a second direction and are arranged side by side and insulated from each other;
   wherein the first direction intersects with the second direction;
   wherein the three-dimensional force recognition sensor further comprises a horizontal pressure recognition component and a vertical pressure recognition component;
   wherein the horizontal pressure recognition component is configured to determine a horizontal pressure direction at a touch control position by detecting a change in a resistance between each of the two first electrodes in each of the first electrode groups and one of the second electrodes in each of the second electrode groups, respectively, and detecting a change in a resistance between each of the two second electrodes in each of the second electrode groups and one of the first electrodes in each of the first electrode groups, respectively; and the vertical pressure recognition component is configured to determine a magnitude of a vertical pressure at a touch control position according to a change in capacitances between the first electrode groups and the second electrode groups.

2. The three-dimensional force recognition sensor according to claim 1, wherein the first direction is perpendicular to the second direction.

3. The three-dimensional force recognition sensor according to claim 1, wherein the first electrodes are parallel to each other.

4. The three-dimensional force recognition sensor according to claim 3, wherein a spacing between adjacent two first electrodes in each first electrode group is equal.

5. The three-dimensional force recognition sensor according to claim 4, wherein a spacing between adjacent two of the first electrode groups is greater than the spacing between the adjacent two first electrodes in a same first electrode group.

6. The three-dimensional force recognition sensor according to claim 1, wherein the second electrodes are parallel to each other.

7. The three-dimensional force recognition sensor according to claim 6, wherein a spacing between adjacent two second electrodes in each second electrode group is equal.

8. The three-dimensional force recognition sensor according to claim 7, wherein a spacing between adjacent two of the second electrode groups is greater than the spacing between the adjacent two second electrodes in a same second electrode group.

9. The three-dimensional force recognition sensor according to claim 1, wherein the pressure-sensitive conductive layer comprises a resin and conductive particles uniformly mixed in the resin.

10. The three-dimensional force recognition sensor according to claim 9, wherein the resin is a phenolic resin or a siloxane.

11. The three-dimensional force recognition sensor according to claim 9, wherein the conductive particles are carbon black.

12. A driving method for the three-dimensional force recognition sensor according to claim 1, wherein when performing horizontal pressure recognition, the driving method comprises:
  using one of the first electrodes in each of the first electrode groups as a first recognition electrode, and using one of the second electrodes in each of the second electrode groups as a second recognition electrode;
  applying a voltage to each first recognition electrode successively, detecting a resistance between each of the second electrodes and the first recognition electrode in a time-sharing manner, and determining a pressure in the first direction at a touch control position according to a change in the resistance between each of the two second electrodes in the same second electrode group and the first recognition electrode, respectively;
  applying a voltage to each second recognition electrode successively, detecting a resistance between each of the first electrodes and the second recognition electrode in a time-sharing manner, and determining a pressure in the second direction at the touch control position according to a change in the resistance between each of the two first electrodes in the same first electrode group and the second recognition electrode, respectively; and
  determining a horizontal pressure direction at the touch control position according to the pressure in the first direction and the pressure in the second direction.

13. The driving method according to claim 12, wherein when performing vertical pressure recognition, the driving method comprises:
  applying a voltage to each of the first electrode groups successively, detecting capacitances between the second electrode groups and the first electrode groups in a time-sharing manner, and determining a vertical pressure at the touch control position according to a change in the capacitances between the first electrode groups and the second electrode groups; or
  applying a voltage to each of the second electrode groups successively, detecting capacitances between the first electrode groups and the second electrode groups in a time-sharing manner, and determining a vertical pressure at the touch control position according to a change in the capacitances between the first electrode groups and the second electrode groups.

14. A display device, comprising a flexible display panel and the three-dimensional force recognition sensor according to claim 1.

15. The display device according to claim 14, wherein the flexible display panel is any one of a liquid crystal display panel, an organic electroluminescent display panel, a plasma display panel or electronic paper.

* * * * *